United States Patent
Chien et al.

(10) Patent No.: US 11,142,688 B2
(45) Date of Patent: Oct. 12, 2021

(54) PRESERVATION METHOD OF QUANTUM DOT AND QUANTUM DOT COMPOSITION

(71) Applicant: Taiwan Hopax Chemicals Mfg. Co., Ltd., Kaohsiung (TW)

(72) Inventors: Wen-Wei Chien, Kaohsiung (TW); Ping-Hung Lin, Kaohsiung (TW); Li-Jane Her, Kaohsiung (TW)

(73) Assignee: Taiwan Hopax Chemicals Mfg. Co., Ltd., Kaohsiung (TW)

( * ) Notice: Subject to any disclaimer, the term of this patent is extended or adjusted under 35 U.S.C. 154(b) by 1160 days.

(21) Appl. No.: 15/588,720

(22) Filed: May 8, 2017

(65) Prior Publication Data

US 2017/0327738 A1 Nov. 16, 2017

Related U.S. Application Data

(60) Provisional application No. 62/333,856, filed on May 10, 2016.

(30) Foreign Application Priority Data

Mar. 21, 2017 (TW) .................. 106109333

(51) Int. Cl.
*C09K 11/02* (2006.01)
*C09K 11/66* (2006.01)
*C09K 15/18* (2006.01)
*B82Y 40/00* (2011.01)
*B82Y 20/00* (2011.01)
*B82Y 30/00* (2011.01)

(52) U.S. Cl.
CPC .......... *C09K 11/665* (2013.01); *C09K 11/025* (2013.01); *C09K 15/18* (2013.01); *B82Y 20/00* (2013.01); *B82Y 30/00* (2013.01); *B82Y 40/00* (2013.01); *Y10S 977/774* (2013.01); *Y10S 977/825* (2013.01); *Y10S 977/84* (2013.01); *Y10S 977/95* (2013.01)

(58) Field of Classification Search
CPC ... C09K 11/025; C09K 11/565; C09K 11/584; C09K 11/883; C09K 11/665
See application file for complete search history.

(56) References Cited

U.S. PATENT DOCUMENTS

2006/0053971 A1* 3/2006 Sun ................... B82Y 30/00
75/370

FOREIGN PATENT DOCUMENTS

CN        102268253        12/2011

OTHER PUBLICATIONS

"Office Action of Taiwan Counterpart Application," dated Nov. 14, 2017, p. 1-p. 5, in which the listed reference was cited.

* cited by examiner

*Primary Examiner* — Matthew E. Hoban
(74) *Attorney, Agent, or Firm* — JCIPRNET

(57) ABSTRACT

A preservation method of a quantum dot and a quantum dot composition are provided. The method includes the following steps. A quantum dot is mixed with a preservative to form a quantum dot composition, wherein the preservative is a long-chain unsaturated compound, and based on the total weight of the quantum dot composition, the content of the quantum dot is 5 wt % to 80 wt %, and the content of the preservative is 20 wt % to 95 wt %. The quantum dot composition is sealed for preservation.

10 Claims, No Drawings

PRESERVATION METHOD OF QUANTUM DOT AND QUANTUM DOT COMPOSITION

CROSS-REFERENCE TO RELATED APPLICATION

This application claims the priority benefit of U.S. provisional application Ser. No. 62/333,856, filed on May 10, 2016, and Taiwan application serial no. 106109333, filed on Mar. 21, 2017. The entirety of each of the above-mentioned patent applications is hereby incorporated by reference herein and made a part of this specification.

BACKGROUND OF THE INVENTION

Field of the Invention

The invention relates to a preservation method of a nanomaterial and a nanomaterial composition, and more particularly, to a preservation method of a quantum dot and a quantum dot composition.

Description of Related Art

The quantum dot is a material having good light absorption and light emission properties, and has properties such as narrow full width of half-maximum, high luminous efficiency, wide absorption spectrum, and high color purity and saturation, and is therefore suitable for application in display panel techniques.

In current quantum dot preparation techniques, the resulting quantum dot is generally re-dispersed or preserved in, for instance, a hexane or toluene solvent. However, hexane or toluene preserving the quantum dot hinders subsequent quantum dot applications (such as the copolymerization with an optically clear adhesive (OCA) or an LED encapsulant), and therefore an additional step of removing hexane and toluene is needed. Moreover, the anti-oxidation and moisture resistance capabilities of the solvent preserving the quantum dot are insufficient, and therefore the quantum dot rapidly decays. As a result, the development of a preservation method of a quantum dot is an important object.

SUMMARY OF THE INVENTION

The invention provides a preservation method of a quantum dot suitable for a high-temperature environment that provides high quantum yield to the quantum dot even in a high-temperature environment.

The invention provides a quantum dot composition having high quantum yield in a high-temperature environment.

The preservation method of the quantum dot of the invention includes the following steps. A quantum dot is mixed with a preservative to form a quantum dot composition, wherein the preservative is a long-chain unsaturated compound, and based on the total weight of the quantum dot composition, the content of the quantum dot is, for instance, 5 wt % to 80 wt %, and the content of the preservative is 20 wt % to 95 wt %. The quantum dot composition is sealed for preservation.

In an embodiment of the invention, the long-chain unsaturated compound is, for instance, a long-chain unsaturated fatty acid, a long-chain unsaturated fatty amine, a long-chain olefin, or a combination thereof.

In an embodiment of the invention, the carbon number of the main chain of the long-chain unsaturated fatty acid is, for instance, 6 or more.

In an embodiment of the invention, the carbon number of the main chain of the long-chain unsaturated fatty amine is, for instance, 8 or more.

In an embodiment of the invention, the preservative is a mixed solvent of the long-chain unsaturated fatty acid and the long-chain unsaturated fatty amine, and the weight ratio of the long-chain unsaturated fatty acid and the long-chain unsaturated fatty amine is, for instance, 1:2.5 to 2.5:1.

In an embodiment of the invention, the preservative is a mixed solvent of the long-chain unsaturated fatty acid and the long-chain olefin, and the weight ratio of the long-chain unsaturated fatty acid and the long-chain olefin is, for instance, 1:2.5 to 2.5:1.

In an embodiment of the invention, the preservative is a mixed solvent of the long-chain olefin and the long-chain unsaturated fatty amine, and the weight ratio of the long-chain olefin and the long-chain unsaturated fatty amine is, for instance, 1:2.5 to 2.5:1.

In an embodiment of the invention, the method of mixing the quantum dot and the preservative may include the following steps. The quantum dot is dispersed in a first solvent to obtain a first quantum dot mixed solution. The preservative is mixed with the first quantum dot mixed solution to obtain a second quantum dot mixed solution. The first solvent in the second quantum dot mixed solution is removed to obtain a quantum dot composition.

In an embodiment of the invention, the first solvent is, for instance, hexane or toluene.

In an embodiment of the invention, the temperature of preserving the quantum dot composition is, for instance, 15° C. to 95° C.

In an embodiment of the invention, the temperature of preserving the quantum dot composition is, for instance, room temperature to 95° C.

The quantum dot composition of the invention includes a quantum dot and a preservative, wherein the preservative is a long-chain unsaturated compound, and based on the total weight of the quantum dot composition, the content of the quantum dot is, for instance, 5 wt % to 80 wt %, and the content of the preservative is 20 wt % to 95 wt %.

In an embodiment of the invention, the long-chain unsaturated compound is, for instance, a long-chain unsaturated fatty acid, a long-chain unsaturated fatty amine, a long-chain olefin, or a combination thereof.

In an embodiment of the invention, the carbon number of the main chain of the long-chain unsaturated fatty acid is, for instance, 6 or more.

In an embodiment of the invention, the carbon number of the main chain of the long-chain unsaturated fatty amine is, for instance, 8 or more.

In an embodiment of the invention, the preservative is a mixed solvent of the long-chain unsaturated fatty acid and the long-chain unsaturated fatty amine, and the weight ratio of the long-chain unsaturated fatty acid and the long-chain unsaturated fatty amine is, for instance, 1:2.5 to 2.5:1.

In an embodiment of the invention, the preservative is a mixed solvent of the long-chain unsaturated fatty acid and the long-chain olefin, and the weight ratio of the long-chain unsaturated fatty acid and the long-chain olefin is, for instance, 1:2.5 to 2.5:1.

In an embodiment of the invention, the preservative is a mixed solvent of the long-chain olefin and the long-chain unsaturated fatty amine, and the weight ratio of the long-chain olefin and the long-chain unsaturated fatty amine is, for instance, 1:2.5 to 2.5:1.

Based on the above, in the preservation method of a quantum dot of the invention, a long-chain unsaturated compound is used within a specific content range as the preservative of the quantum dot such that the quantum dot composition can be sealed and preserved at room temperature and in a high-temperature environment higher than room temperature. Moreover, in the invention, a long-chain unsaturated compound is used as the preservative of a quantum dot, and therefore in a subsequent quantum dot application, an additional step to remove the preservative is not needed, such that the applicability of the quantum dot composition can be increased and process efficiency can be increased.

In order to make the aforementioned features and advantages of the disclosure more comprehensible, embodiments accompanied with FIGURES are described in detail below.

DESCRIPTION OF THE EMBODIMENTS

In the present specification, a range represented by "a numerical value to another numerical value" is a schematic representation for avoiding listing all of the numerical values in the range in the specification. Therefore, the recitation of a specific numerical range covers any numerical value in the numerical range and a smaller numerical range defined by any numerical value in the numerical range, as is the case with the any numerical value and the smaller numerical range stated explicitly in the specification.

In the present specification, the definition of "room temperature" is 25 Celsius.

In the following, embodiments are provided to describe the preservation method of a quantum dot and the quantum dot composition of the invention in detail as examples of actual implementation of the invention.

[Quantum Dot Composition]

An embodiment of the invention provides a quantum dot composition including a quantum dot and a preservative, wherein the preservative is a long-chain unsaturated compound. In an embodiment, the quantum dot is an organic-inorganic perovskite quantum dot. In another embodiment, the quantum dot is an inorganic perovskite quantum dot. However, the invention is not limited thereto, and any nanocrystal emitting light upon excitation can be used as the quantum dot of the invention.

In the present embodiment, the long-chain unsaturated compound used as the preservative is a long-chain unsaturated compound that is liquid at room temperature and does not chemically react with a quantum dot. In an embodiment, the long-chain unsaturated compound is, for instance, a long-chain unsaturated fatty acid, a long-chain unsaturated fatty amine, a long-chain olefin, or a combination thereof. In the present embodiment, the carbon number of the main chain of the long-chain unsaturated fatty acid is, for instance, 6 or more. Specifically, the carbon number of the main chain of the long-chain unsaturated fatty acid is, for instance, 6 to 18. For instance, the long-chain unsaturated fatty acid is, for instance, oleic acid, undecenoic acid, or decenoic acid. The carbon number of the main chain of the long-chain unsaturated fatty amine is, for instance, 8 or more. Specifically, the carbon number of the main chain of the long-chain unsaturated fatty amine is, for instance, 8 to 18. For instance, the long-chain unsaturated fatty amine is, for instance, oleylamine, dodecylamine, or octylamine. The long-chain olefin is, for instance, octadecene, hexadecene, or octene.

In the present embodiment, based on the total weight of the quantum dot composition, the content of the quantum dot is 5 wt % to 80 wt %, and the content of the preservative is 20 wt % to 95 wt %. In an embodiment, when the contents of the quantum dot and the preservative are within the ranges above, the quantum dot in the quantum dot composition has high quantum yield at a temperature of 15° C. to 95° C. In an embodiment, when the contents of the quantum dot and the preservative are within the ranges above, the quantum dot in the quantum dot composition has high quantum yield at a temperature of room temperature to 95° C. In an embodiment, when the contents of the quantum dot and the preservative are within the ranges above, the quantum dot in the quantum dot composition has high quantum yield at a temperature of room temperature to 85° C.

In an embodiment, one of the long-chain unsaturated fatty acid, the long-chain unsaturated fatty amine, and the long-chain olefin can be used as the preservative alone.

In an embodiment, two or more of the long-chain unsaturated fatty acid, the long-chain unsaturated fatty amine, and the long-chain olefin can be used as the preservative.

In an embodiment, the preservative is, for instance, a mixed solvent of the long-chain unsaturated fatty acid and the long-chain unsaturated fatty amine, and the weight ratio of the long-chain unsaturated fatty acid and the long-chain unsaturated fatty amine is, for instance, 1:2.5 to 2.5:1. In another embodiment, the weight ratio of the long-chain unsaturated fatty acid and the long-chain unsaturated fatty amine is, for instance, 1:2 to 2:1. In an embodiment, the preservative is, for instance, a mixed solvent of the long-chain unsaturated fatty acid and the long-chain olefin, and the weight ratio of the long-chain unsaturated fatty acid and the long-chain olefin is, for instance, 1:2.5 to 2.5:1. In another embodiment, the weight ratio of the long-chain unsaturated fatty acid and the long-chain olefin is, for instance, 1:2 to 2:1. In an embodiment, the preservative is a mixed solvent of the long-chain olefin and the long-chain unsaturated fatty amine, and the weight ratio of the long-chain olefin and the long-chain unsaturated fatty amine is, for instance, 1:2.5 to 2.5:1. In another embodiment, the weight ratio of the long-chain olefin and the long-chain unsaturated fatty amine is, for instance, 1:2 to 2:1. In an embodiment, when the mixing ratio of the preservative is within the range above, the quantum dot composition has high quantum yield at a temperature of 15° C. to 95° C. In an embodiment, when the mixing ratio of the preservative is within the range above, the quantum dot composition has high quantum yield at a temperature of room temperature to 95° C. In an embodiment, when the mixing ratio of the preservative is within the range above, the quantum dot composition has high quantum yield at a temperature of room temperature to 85° C.

In the present embodiment, a long-chain unsaturated compound is used as the preservative of the quantum dot and a hexane solvent . . . etc. is not used as the preservative of the quantum dot, and therefore in a subsequent quantum dot application (such as the copolymerization with an optically clear adhesive (OCA) or an LED encapsulant), an additional step of removing the preservative is not needed, and therefore process efficiency can be increased.

[Preservation Method of Quantum Dot]

An embodiment of the invention provides a preservation method of a quantum dot including the following steps. First, any quantum dot composition in the embodiments above is prepared. Specifically, the preparation method of the quantum dot composition includes mixing a quantum dot and a preservative, wherein the preservative is a long-chain unsaturated compound. The quantum dot composition and relevant descriptions of each component thereof are described in detail in the above embodiments and are therefore not repeated herein.

In the present embodiment, the quantum dot and the preservative are directly mixed to prepare the quantum dot composition. In another embodiment, the quantum dot can first be dispersed in another solvent and then mixed with the preservative to prepare the quantum dot composition. Specifically, the method of mixing the quantum dot and the preservative may include the following steps. First, the quantum dot is dispersed in a first solvent to obtain a first quantum dot mixed solution. The first solvent is, for instance, hexane or toluene. Next, the preservative is mixed with the first quantum dot mixed solution to obtain a second quantum dot mixed solution. Next, the first solvent in the second quantum dot mixed solution is removed to obtain the quantum dot composition. The method of removing the first solvent is, for instance, removing the first solvent in the second quantum dot mixed solution using a vacuum pump or a rotary evaporator. In the present embodiment, the first solvent in the second quantum dot mixed solution can be substantially completely removed via the method above.

Next, the quantum dot composition is sealed for preservation. Specifically, the quantum dot composition is, for instance, sealed and preserved in a container. The container is, for instance, a glass container or a plastic container.

In an embodiment, the temperature of preserving the quantum dot composition is, for instance, 15° C. to 95° C. In another embodiment, the temperature of preserving the quantum dot composition is, for instance, room temperature to 95° C. In yet another embodiment, the temperature of preserving the quantum dot composition is, for instance, room temperature to 85° C. When the contents of the quantum dot and the preservative are within the ranges above, the quantum dot has high quantum yield at room temperature and in a high-temperature environment higher than room temperature. Therefore, the preservation method of the present embodiment can effectively preserve the quantum dot. As a result, the preservation method of the quantum dot of the present embodiment can effectively preserve the quantum dot at room temperature and in a high-temperature environment higher than room temperature via a simple process.

Moreover, a long-chain unsaturated compound is used as the preservative of the quantum dot and a hexane solvent . . . etc. is not used as the preservative of the quantum dot, and therefore in a subsequent quantum dot application, an additional step to remove the preservative is not needed, such that the applicability of the quantum dot composition can be increased and process efficiency can be increased.

Next, the features of the invention are described with embodiments. However, without departing from the spirit of the invention, the materials and usage methods . . . etc. in the following embodiments can be suitably modified. Therefore, the scope of the invention should not be construed to the following embodiments.

[Preparation of $CsPbBr_3$ Quantum Dot]

The preparation process of the $CsPbBr_3$ quantum dot is as shown below: 1.00 g of cesium carbonate, 60 mL of octadecene, and 4.66 mL of oleic acid were added in a 100 mL three-necked bottle. Heating was performed in vacuum at 120° C. for 1 hour to remove water. Heating was performed in a nitrogen atmosphere to 150° C. until cesium carbonate and oleic acid were completely reacted to obtain a cesium oleate precursor.

200 mL of octadecene and 5.10 g of lead bromide were added in a 500 mL three-necked bottle. Heating was performed in vacuum at 120° C. for 1 hour to remove water. 30 mL of oleylamine and 30 mL of oleic acid were injected in the three-necked bottle in a nitrogen atmosphere, and the temperature was increased to 140° C. to 200° C. after the solution became clear. Next, 60 mL of the cesium oleate precursor was rapidly injected into the three-necked bottle, and after 5 seconds, the temperature was reduced to room temperature. After 1 hour, the mixture was centrifuged to obtain the $CsPbBr_3$ quantum dot.

Example 1

5 g of the $CsPbBr_3$ quantum dot prepared in the above embodiment was dispersed in a 1 L hexane solvent to obtain a first quantum dot mixed solution. Next, 5 g of oleic acid was mixed with the first quantum dot mixed solution to obtain a second quantum dot mixed solution. Next, the hexane in the second quantum dot mixed solution was removed using a rotary evaporator to form a quantum dot composition. Next, the quantum dot composition was sealed in a glass container.

Example 2

The quantum dot was preserved using a similar method to example 1, and the difference thereof is only that 5 g of undecylenic acid was used to replace the 5 g of oleic acid in example 1.

Example 3

The quantum dot was preserved using a similar method to example 1, and the difference thereof is only that 5 g of oleylamine was used to replace the 5 g of oleic acid in example 1.

Example 4

The quantum dot was preserved using a similar method to example 1, and the difference thereof is only that 5 g of octadecence was used to replace the 5 g of oleic acid in example 1.

Example 5

The quantum dot was preserved using a similar method to example 1, and the difference thereof is only that 5 g of hexadecene was used to replace the 5 g of oleic acid in example 1.

Example 6

The quantum dot was preserved using a similar method to example 1, and the difference thereof is only that 5 g of octene was used to replace the 5 g of oleic acid in example 1.

Example 7

The quantum dot was preserved using a similar method to example 1, and the difference thereof is only that 5 g of a mixed solvent of oleic acid/oleylamine was used to replace the 5 g of oleic acid in example 1, and the weight ratio of the oleic acid and the oleylamine in the mixed solvent of example 7 is 1:1.

Example 8

The quantum dot was preserved using a similar method to example 7, and the difference thereof is only that the weight ratio of the oleic acid and the oleylamine in the mixed solvent of example 8 is 1:2.

Example 9

The quantum dot was preserved using a similar method to example 7, and the difference thereof is only that the weight ratio of the oleic acid and the oleylamine in the mixed solvent of example 9 is 2:1.

Example 10

The quantum dot was preserved using a similar method to example 1, and the difference thereof is only that 5 g of a mixed solvent of oleic acid/octadecene was used to replace the 5 g of oleic acid in example 1, and the weight ratio of the oleic acid and the octadecene in the mixed solvent of example 10 is 1:1.

Example 11

The quantum dot was preserved using a similar method to example 10, and the difference thereof is only that the weight ratio of the oleic acid and the octadecene in the mixed solvent of example 11 is 1:2.

Example 12

The quantum dot was preserved using a similar method to example 10, and the difference thereof is only that the weight ratio of the oleic acid and the octadecene in the mixed solvent of example 12 is 2:1.

Example 13

The quantum dot was preserved using a similar method to example 1, and the difference thereof is only that 5 g of a mixed solvent of octadecene/oleylamine was used to replace the 5 g of oleic acid in example 1, and the weight ratio of the octadecene and the oleylamine in the mixed solvent of example 13 is 1:1.

Example 14

The quantum dot was preserved using a similar method to example 13, and the difference thereof is only that the weight ratio of the octadecene and the oleylamine in the mixed solvent of example 14 is 1:2.

Example 15

The quantum dot was preserved using a similar method to example 13, and the difference thereof is only that the weight ratio of the octadecene and the oleylamine in the mixed solvent of example 15 is 2:1.

Comparative Example 1

The quantum dot was preserved using a similar method to example 1, and the difference thereof is only that 5 g of hexanoic acid was used to replace the 5 g of oleic acid in example 1.

Comparative Example 2

The quantum dot was preserved using a similar method to example 1, and the difference thereof is only that 5 g of butyric acid was used to replace the 5 g of oleic acid in example 1.

Comparative Example 3

The quantum dot was preserved using a similar method to example 1, and the difference thereof is only that 5 g of acrylic acid was used to replace the 5 g of oleic acid in example 1.

Comparative Example 4

The quantum dot was preserved using a similar method to example 1, and the difference thereof is only that 5 g of octylamine was used to replace the 5 g of oleic acid in example 1.

Comparative Example 5

The quantum dot was preserved using a similar method to example 1, and the difference thereof is only that 5 g of hexylamine was used to replace the 5 g of oleic acid in example 1.

Comparative Example 6

The quantum dot was preserved using a similar method to example 1, and the difference thereof is only that 5 g of butylamine was used to replace the 5 g of oleic acid in example 1.

Comparative Example 7

The quantum dot was preserved using a similar method to example 1, and the difference thereof is only that 5 g of octane was used to replace the 5 g of oleic acid in example 1.

Comparative Example 8

The quantum dot was preserved using a similar method to example 1, and the difference thereof is only that 5 g of hexane was used to replace the 5 g of oleic acid in example 1.

Comparative Example 9

The quantum dot was preserved using a similar method to example 7, and the difference thereof is only that the weight ratio of the oleic acid and the oleylamine in the mixed solvent of comparative example 9 is 1:3.

Comparative Example 10

The quantum dot was preserved using a similar method to example 7, and the difference thereof is only that the weight ratio of the oleic acid and the oleylamine in the mixed solvent of comparative example 10 is 3:1.

Comparative Example 11

The quantum dot was preserved using a similar method to example 7, and the difference thereof is only that the weight ratio of the oleic acid and the oleylamine in the mixed solvent of comparative example 11 is 1:4.

Comparative Example 12

The quantum dot was preserved using a similar method to example 7, and the difference thereof is only that the weight ratio of the oleic acid and the oleylamine in the mixed solvent of comparative example 12 is 4:1.

Comparative Example 13

The quantum dot was preserved using a similar method to example 10, and the difference thereof is only that the weight ratio of the oleic acid and the octadecene in the mixed solvent of comparative example 13 is 1:4.

Comparative Example 14

The quantum dot was preserved using a similar method to example 10, and the difference thereof is only that the weight ratio of the oleic acid and the octadecene in the mixed solvent of comparative example 14 is 4:1.

Comparative Example 15

The quantum dot was preserved using a similar method to example 13, and the difference thereof is only that the weight ratio of the octadecene and the oleylamine in the mixed solvent of comparative example 15 is 1:3.

Comparative Example 16

The quantum dot was preserved using a similar method to example 13, and the difference thereof is only that the weight ratio of the octadecene and the oleylamine in the mixed solvent of comparative example 16 is 3:1.

Comparative Example 17

The quantum dot was preserved using a similar method to example 13, and the difference thereof is only that the weight ratio of the octadecene and the oleylamine in the mixed solvent of comparative example 17 is 1:4.

Comparative Example 18

The quantum dot was preserved using a similar method to example 13, and the difference thereof is only that the weight ratio of the octadecene and the oleylamine in the mixed solvent of comparative example 18 is 4:1.

The glass containers in which the quantum dot compositions of examples 1 to 15 are sealed and the glass containers in which the quantum dot compositions of comparative examples 1 to 18 are sealed were preserved for 3 hours under different temperature conditions (25° C. or 85° C.). Next, the quantum yield (QY) of the quantum dots of examples 1 to 15 and comparative examples 1 to 18 was measured. The test results are provided in Table 1.

TABLE 1

|  | Emission wavelength (nm) | 25° C., quantum yield (%) | 85° C., quantum yield (%) |
| --- | --- | --- | --- |
| Example 1 | 530 | 90 | 85 |
| Example 2 | 528 | 92 | 83 |
| Example 3 | 530 | 90 | 84 |
| Example 4 | 530 | 90 | 88 |
| Example 5 | 530 | 91 | 87 |
| Example 6 | 530 | 93 | 75 |
| Example 7 | 530 | 95 | 90 |
| Example 8 | 530 | 91 | 88 |
| Example 9 | 530 | 93 | 89 |
| Example 10 | 528 | 94 | 88 |
| Example 11 | 531 | 91 | 86 |
| Example 12 | 532 | 93 | 85 |
| Example 13 | 529 | 93 | 89 |
| Example 14 | 531 | 80 | 74 |
| Example 15 | 531 | 90 | 85 |
| Comparative example 1 | 525 | 75 | 40 |
| Comparative example 2 | 525 | 42 | 35 |
| Comparative example 3 | 522 | 31 | 10 |
| Comparative example 5 | 523 | 69 | 48 |
| Comparative example 5 | 522 | 43 | 22 |
| Comparative example 6 | 520 | 32 | 8 |
| Comparative example 7 | 530 | 90 | 64 |
| Comparative example 8 | 530 | 89 | 38 |
| Comparative example 9 | 522 | 71 | 65 |
| Comparative example 10 | 525 | 74 | 58 |
| Comparative example 11 | 520 | 59 | 42 |
| Comparative example 12 | 525 | 65 | 55 |
| Comparative example 13 | 525 | 59 | 45 |
| Comparative example 14 | 525 | 65 | 50 |
| Comparative example 15 | 522 | 71 | 68 |
| Comparative example 16 | 528 | 73 | 68 |
| Comparative example 17 | 520 | 59 | 45 |
| Comparative example 18 | 527 | 60 | 50 |

It can be known from Table 1 that, the quantum dot compositions of example 1 to example 15 can have high quantum yield when preserved at room temperature and still have a quantum yield of 70% or more at high temperature (85° C.), even higher than 80%. In other words, example 1 and example 2 in which a long-chain unsaturated fatty acid is used as the preservative, example 3 in which a long-chain unsaturated fatty amine is used as the preservative, example 4 to example 6 in which a long-chain olefin is used as the preservative, and example 7 to example 15 in which a long-chain unsaturated compound in a specific mixing ratio is used as the preservative can all effectively preserve at room temperature and a high-temperature environment higher than room temperature.

On the other hand, the quantum yield of the quantum dot compositions of comparative example 1 to comparative example 18 at high temperature is significantly lower than the examples, and the quantum yield of the quantum dot compositions of comparative example 2 to comparative example 6 and comparative example 11 to comparative example 14 at room temperature is only 70% or less, which is significantly lower than the quantum dot efficiency of the quantum dot compositions of the examples at room temperature.

What is claimed is:

1. A preservation method of a quantum dot, the method is consisting of the following steps:
dispersing a quantum dot in a first solvent to obtain a first quantum dot mixed solution;
mixing a preservative and the first quantum dot mixed solution to obtain a second quantum dot mixed solution;
removing the first solvent in the second quantum dot mixed solution to obtain a quantum dot composition, wherein the quantum dot composition only includes the quantum dot and the preservative, wherein the preservative is a long-chain unsaturated compound, and based on a total weight of the quantum dot composition, a content of the quantum dot is 5 wt % to 80 wt %, and a content of the preservative is 20 wt % to 95 wt %; and
sealing the quantum dot composition for preservation.

2. The preservation method of the quantum dot of claim 1, wherein the long-chain unsaturated compound comprises a long-chain unsaturated fatty acid, a long-chain unsaturated fatty amine, a long-chain olefin, or a combination thereof.

3. The preservation method of the quantum dot of claim 2, wherein a carbon number of a main chain of the long-chain unsaturated fatty acid is 6 or more.

4. The preservation method of the quantum dot of claim 2, wherein a carbon number of a main chain of the long-chain unsaturated fatty amine is 8 or more.

5. The preservation method of the quantum dot of claim 2, wherein the preservative is a mixed solvent of the long-chain unsaturated fatty acid and the long-chain unsaturated fatty amine, and a weight ratio of the long-chain unsaturated fatty acid and the long-chain unsaturated fatty amine is 1:2.5 to 2.5:1.

6. The preservation method of the quantum dot of claim 2, wherein the preservative is a mixed solvent of the long-chain unsaturated fatty acid and the long-chain olefin, and a weight ratio of the long-chain unsaturated fatty acid and the long-chain olefin is 1:2.5 to 2.5:1.

7. The preservation method of the quantum dot of claim 2, wherein the preservative is a mixed solvent of the long-chain olefin and the long-chain unsaturated fatty amine, and a weight ratio of the long-chain olefin and the long-chain unsaturated fatty amine is 1:2.5 to 2.5:1.

8. The preservation method of the quantum dot of claim 1, wherein the first solvent comprises hexane or toluene.

9. The preservation method of the quantum dot of claim 1, wherein a temperature of preserving the quantum dot composition is 15° C. to 95° C.

10. The preservation method of the quantum dot of claim 1, wherein a temperature of preserving the quantum dot composition is room temperature to 95° C.

* * * * *